United States Patent [19]

Padilla

[11] 4,434,034

[45] Feb. 28, 1984

[54] DIRECT FIRED GLYCOL REGENERATOR WITH VERTICAL FLUES

[76] Inventor: Isaac F. Padilla, Rte. 3, Box 711, Farmington, N. Mex. 87401

[21] Appl. No.: 411,084

[22] Filed: Aug. 23, 1982

[51] Int. Cl.³ .............................................. B01D 3/02
[52] U.S. Cl. .................................... 202/153; 202/165; 202/183; 203/18
[58] Field of Search ............... 202/153, 158, 163, 165, 202/166, 182, 183, 184, 81; 203/18, 42; 55/32, 33; 159/31, 46, 48 L, DIG. 10, 1 R

[56] References Cited

U.S. PATENT DOCUMENTS

| | | | |
|---|---|---|---|
| 4,010,065 | 3/1977 | Alleman | 203/18 |
| 4,179,328 | 12/1979 | Barra et al. | 203/18 |
| 4,332,643 | 6/1982 | Reid | 203/18 |

*Primary Examiner*—Frank Sever
*Attorney, Agent, or Firm*—Harvey B. Jacobson

[57] ABSTRACT

A liquid desiccant regenerator is provided including an upstanding hollow reboiler having upstanding peripheral sides, a bottom and a top. A plurality of laterally space upstanding tubular flues are provided in the reboiler and open upwardly and downwardly through the top and bottom. A flue plenum chamber is disposed over the top into which the upper ends of the tubular flues open and a flue pipe opens upwardly from the plenum chamber. A combustion chamber is disposed below the bottom including low pressure gas burner structure therein and into which the lower ends of the flues open. An upper portion of the reboiler includes a lateral extension and a still column is supported from the lateral extension and is positioned relative thereto for regenerated liquid desiccant drainage from the lower end of the column into the lateral extension. The reboiler is designed to be operated with a predetermined liquid desiccant level above and below the upper and lower extremities of the lateral extension and the reboiler includes a scum baffle protected liquid desiccant outlet disposed substantially at the aforementioned level and extends above and below the latter.

10 Claims, 3 Drawing Figures

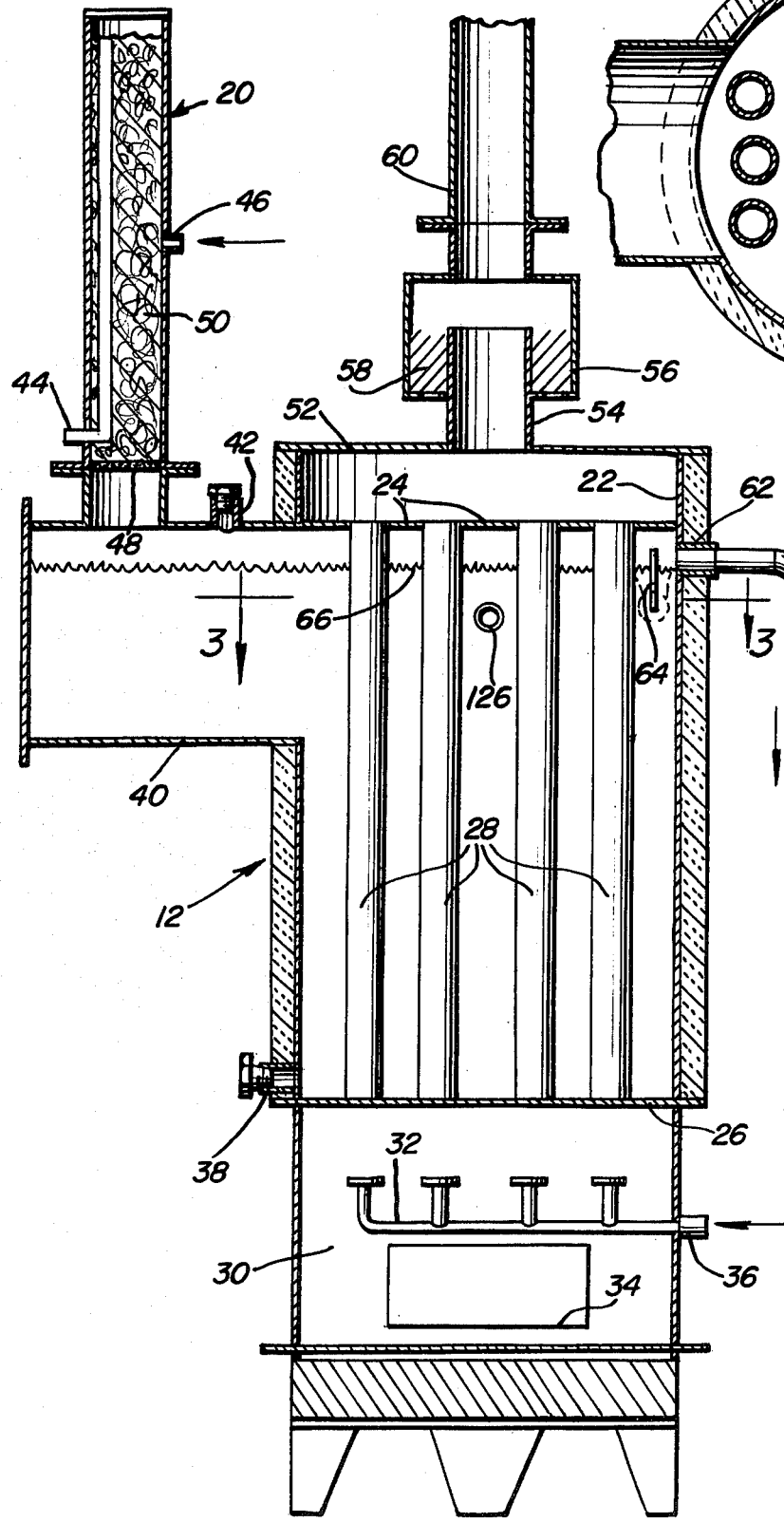
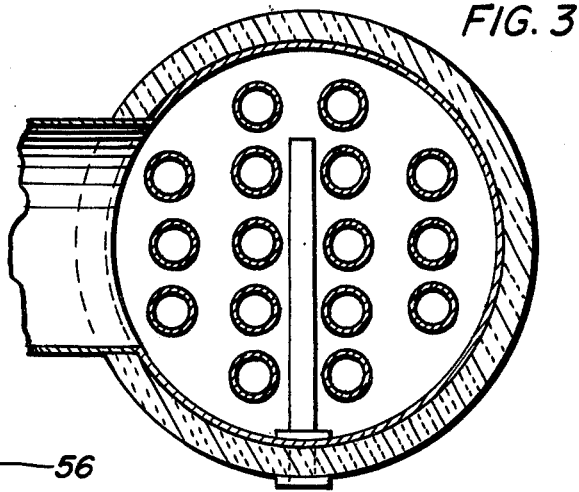

DIRECT FIRED GLYCOL REGENERATOR WITH VERTICAL FLUES

BACKGROUND OF THE INVENTION

Most reboilers used in a liquid desiccant regenerator system comprise horizontal reboilers into which a horizontal fire tube projects and the fire tube is equipped with an outer end pressurized fuel fed burner. However, this type of construction necessitates the provision of a fuel source under pressure, affords heat transfer from the burner to the desiccant within the reboiler at less than maximum efficiency and requires a greater amount of fuel to affect the same desiccant regeneration process. Accordingly, a need exists for a more efficient desiccant regeneration system wherein a low pressure fuel may be used more efficiently to affect a given desiccant regeneration process.

Examples of desiccant regenerators including some of the general structural and operational features of the instant invention are disclosed in U.S. Pat. Nos. 3,094,574, 3,370,636, 3,450,603, 3,841,382, 3,914,115, and 4,010,009.

BRIEF DESCRIPTION OF THE INVENTION

The desiccant regeneration system of the instant invention utilizes an upright reboiler including vertical flues extending therethrough and a fire box or combustion chamber beneath the lower ends of the flues and a flue plenum over the upper ends of the flues including an upwardly projecting flue outlet. The reboiler includes an upper end portion lateral extension from which an upstanding still column is supported and the still column is operative to drain dry desiccant therefrom down into the reboiler. A wall portion of the reboiler remote from the lateral extension is equipped with a dried desiccant outlet protected by a baffle disposed at the level of desiccant within the reboiler and projecting above and below the level. The outlet of the reboiler extends to the inlet of a heat exchanger and the heat exchanger includes an outlet which opens into a dry desiccant storage tank. The storage tank includes an outlet communicated with the inlet of a glycol-gas contactor tower also including an outlet communicated with the inlet end of a heat exchange coil in the heat exchanger. The heat exchange coil is provided with an outlet in turn communicated with the aforementioned still column.

The glycol-gas contacter tower has a wet gas passed therethrough in the same or opposite direction to the path of movement of the dry desiccant through the tower and water within the gas is absorbed by the desiccant. When the desiccant leaves the tower it passes through the heat exchanger and is heated thereby and thereafter passed to the still column in which the water is driven from the desiccant in the form of steam, the steam being allowed to vent and condense through a drain for the column and the dry dessicant being allowed to drain from the column back into the upper portion of the reboiler.

The reboiler includes vertical flue tubes extending therethrough and therefore may utilize convection currents of the heat of combustion within the combustion chamber below the reboiler for heating the tubes and thus the dry desiccant within the reboiler. In this manner, low pressure gas may be used to fire the burner structure within the combustion chamber and a greater heat exchange is affected from the heat of combustion to the dry desiccant within the reboiler.

The main object of this invention is to provide a desiccant regenerator capable of efficient operation with a minimum of fuel.

Another object of this invention is to provide a regenerator in accordance with the preceding object and constructed in a manner whereby the combustion chamber of the reboiler may be fired by low pressure gas.

The final object of this invention to be specifically enumerated herein is to provide a desiccant regenerator in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is an enlarged vertical sectional view illustrating the internal structural features of the reboiler and heat exchanger portions of the desiccant regenerator system;

FIG. 3 is a horizontal sectional view taken substantially upon the plane indicated by the section line 3—3 of FIG. 2.

DETAILED DESCRIPTION OF THE INVENTION

Figure 1:
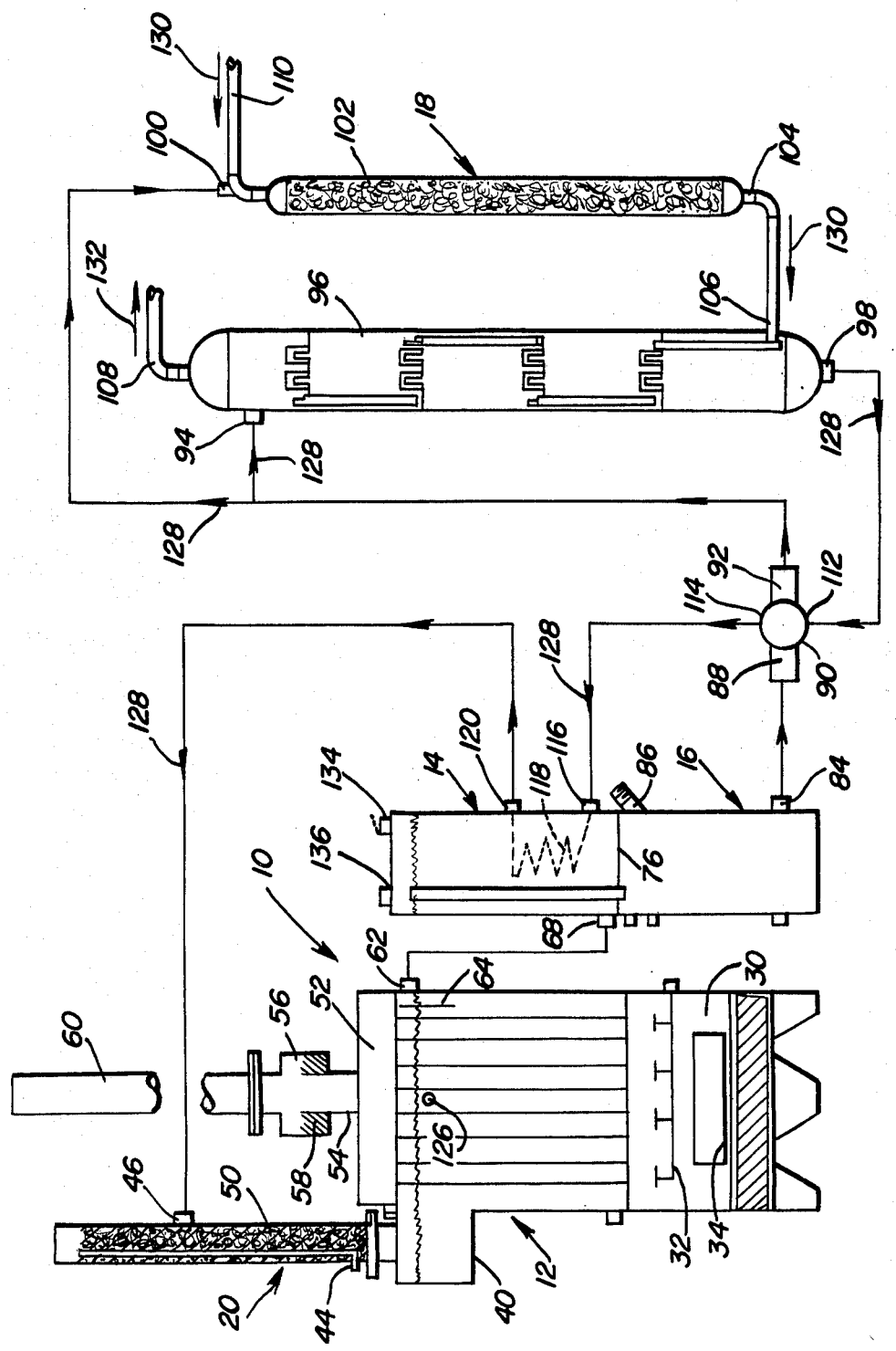
FIG. 1 is a schematic view of a desiccant regenerator system utilizing the improved reboiler of the instant invention.

Referring now more specifically to the drawings the numeral 10 generally designates a desiccant regenerator system incorporating the reboiler of the instant invention. The system is referred to in general by the reference numeral 10 and includes a reboiler 12, a heat exchanger 14, a storage tank 16 for dry desiccant, a gas-desiccant contactor tower assembly 18 and a still column 20.

The reboiler 12 includes an insulated housing having upstanding peripheral walls 22, a top wall 24 and a bottom wall 26. The reboiler includes a plurality of upstanding flue tubes 28 which extend vertically and open upwardly and downwardly through the top wall 24 and the bottom wall 26, respectively. The reboiler 12 further includes a combustion chamber 30 disposed below the bottom wall 26 and in which a low pressure gas burner assembly 32 is disposed. The combustion chamber 30 includes a flame proof access opening 34 and the burner assembly includes a low pressure gas fuel inlet 36 for operative communication with a source (not shown) of gas fuel under low pressure, also includes an air intake. Further, the inlet 36 also includes a low pressure pilot light assembly (not shown).

The lower portion of the reboiler 12 includes a removably closed drain outlet 38 and the upper portion of the reboiler 12 includes a lateral extension 40 including a removably closable inlet 42. Further, the lateral extension 40 supports the lower end of the upstanding still column 20 and the column 20 includes a water vapor and condensed water outlet 44 and a wet desiccant inlet 46. The column 20 includes a foraminous bottom 48 through which dry desiccant may drain into the lateral extension 40 of the reboiler 12 and the interior of the column includes a fill of contact area filler 50 such as ceramic stones or steel pall rings.

Mounted over the top wall 24 is a plenum chamber 52 upwardly from which a plenum pipe projects and the plenum pipe 54 includes a draft hood 56 operatively associated therewith including a flame arrester 58. The plenum pipe 54 discharges upwardly into an exhaust stack 60 of conventional design.

A side wall portion of the reboiler 12 remote from the extension 40 has a dry desiccant outlet 62 formed therein and the outlet 62 is guarded by a scum baffle 64 extending across the outlet 62 at the predetermined level 66 of dry desiccant within the reboiler 12. The outlet 62 is communicated with a lower inlet 68 of the heat exchanger 14 by a connecting pipe 72. The heat exchanger 14 includes an overflow type outlet 74 which extends downwardly from an upper portion of the interior of the heat exchanger 14 and opens through the bottom wall 76 thereof into the upper portion of the dry desiccant storage tank 16. The storage tank 16 includes a pair of upper and lower gauge glasses 80 and 82 and an outlet 84 as well as a removably openable filler 86. The outlet 84 is communicated with a first inlet 88 of a driven pump 90 including a first outlet 92 communicated with an inlet 94 of a first gas-desiccant contactor tower 96 of the tray type and including a wet desiccant outlet 98. In addition, the outlet 92 is communicated with an inlet 100 of a second co-current flow contacter tower 102, the tower 102 including a damp desiccant outlet 104 communicated with a lower inlet 106 of the tower 96. The tower 96 includes a dry gas outlet 108 and the tower 102 includes a damp gas inlet 110.

The towers 96 and 102 together comprise the assembly 18 hereinabove referred to.

The outlet 98 is communicated with a second inlet 112 of the pump 90 and the pump 90 includes a second outlet 114 communicated with the inlet 116 of a heat exchange coil 118 disposed within the heat exchanger 14. The coil 118 includes an outlet 120 communicated with the inlet 46 for the still column 20.

In operation, a quantity of a dry desiccant such as glycol is disposed within the reboiler 12 to the level 66 while an additional quantity of dry glycol is disposed within the tank 16 to the level 124 therein. The burner assembly 32 is placed in operation and the desiccant or glycol within the reboiler is heated. The burner assembly 32 is under the control of a thermostat 126 within the reboiler 12. The thermostat 126 may be operatively connected to the inlet 36 for the burner assembly 32 in any convenient manner so as to provide necessary operation of the burner assembly 32 in order to achieve and maintain the desired temperature of desiccant or glycol within the reboiler 12. After the desiccant within the reboiler 12 has been heated to the desired temperature, the pump 90 may be initiated to cause desiccant flow in the direction of the arrows 128 in FIG. 1. At the same time, the damp gas to be dried may be pumped in the direction of the arrows 130 in FIG. 1 and caused to be discharged from the assembly 18 in the direction of the arrow 132 after being dried.

As the damp desiccant is pumped through the coil 118 it is heated and it is thereafter pumped into the column 20 for contact with the heated area filler 50 therein. The water within the damp desiccant is heated to a level above boiling point and is thus driven off in the form of steam toward the upper portion of the tower 20 and allowed to drain therefrom in the form of condensation to the outlet 44. The dry desiccant drains downward through the filler 50 and into the reboiler 12. The dry desiccant flows horizontally toward the outlet 62 and passes under the baffle 64 toward the outlet 62 and from the latter into the lower portion of the heat exchanger 14 through which the desiccant is then pumped for drainage into the tank 16. Of course, the desiccant is cooled during its passage through the heat exchanger 14 and thus is received in the tank 16 in a cooled state.

The heat exchanger 14 includes a closable filler 134 and a vent outlet 136 opening upwardly through its top wall 138. In addition, the upper portion of the tank 16 includes a vent 140.

In as much as natural convection currents will allow the heat of combustion to move upward through the flue tubes 28, the burner assembly 32 may be supplied gas fuel under low pressure. In addition, the pilot light (not shown) of the burner assembly 32 may also be supplied gas fuel under low pressure. Further, the burner assembly 32 heats the entire bottom 26 of the reboiler 12 as do the external surfaces of the tubes 28 extending between the bottom 26 and the top 24 of the reboiler 12. Accordingly, efficient heat transfer from the heat of combustion of the burner assembly 32 to the desiccant within the reboiler 12 is affected at a minimum fuel consumption rate. This is due in part because the burner assembly 32 will be effective if suppled a gas fuel at between four to ten ounces of pressure whereas a horizontal blower type burner requires between five to ten pounds pressure of the same gas fuel for efficient operation. The decrease in gas pressure at the burner assembly allows slower movement of the heat of combustion through the flue tubes 28 and a greater heat transfer therefrom to the desiccant within the reboiler 12.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A direct fired liquid desiccant regenerator designed for fuel efficient operation on low pressure gas fuel comprising elements designed, dimensioned and arranged for regenerating a liquid dessicant, including an upstanding hollow reboiler provided with upstanding peripheral sides, a top and a bottom, a plurality of laterally spaced upstanding tubular flues disposed in said reboiler and opening upwardly and downwardly through said top and bottom, a flue plenum chamber disposed over said top into which said tubular flues open and a flue pipe opening upwardly from said plenum chamber, a combustion chamber disposed below said bottom including low pressure gas burner means therein and into which chamber the lower ends of the tubular flues open, an upper portion of said reboiler including a lateral extension, a still column supported and projecting upwardly from said lateral extension and positioned for regenerated liquid desiccant drainage from the lower end of said column into said lateral extension, said reboiler being adapted for operation with a predetermined liquid desiccant level above and below the lower and upper extremities, respectively, of said lateral extension, said reboiler including a scum baffle protected liquid desiccant outlet in an upstanding side thereof remote from said lateral extension and disposed substantially at said level and extending above and below the latter, a heat exchanger tank including a lower level desiccant inlet and an upper overflow type desiccant outlet, said reboiler outlet being communicated with said heat exchanger inlet, a liquid desiccant storage tank including an inlet communicated with said heat exchanger outlet, said tank including an outlet, a contactor tower, including a liquid desiccant inlet with which said storage tank outlet is communicated and further including an outlet communicated with the inlet of a heat exchange coil in said heat exchanger, said heat exchanger coil including an outlet communicated with an inlet for said column, and pump means for pumping dry desiccant from said tank outlet to said contactor tower inlet and wet desiccant from said tower outlet to said heat exchanger coil inlet.

2. The regenerator of claim 1 wherein said heat exchanger comprises an upper portion of a vertically elongated structure whose lower portion comprises said tank.

3. The regenerator of claim 1 wherein said flue pipe includes a draft hood serially connected therein equipped with a fire arrester.

4. The regenerator of claim 1 wherein said contactor tower includes a pair of tower elements including a first tower element utilizing co-directional flow of damp gas and desiccant and a second tower element serially connected with said first tower element and utilizing reverse directional flow of damp gas and desiccant.

5. The regenerator of claim 1 wherein said burner means includes burner heads substantially vertically aligned with the lower ends of said tubular flues.

6. The regenerator of claim 1 wherein said pump means includes a first pump section interposed between said tank outlet and said contactor inlet and a second pump section interposed between said tower outlet and said heat exchange coil inlet.

7. The regenerator of claim 6 wherein said heat exchanger comprises an upper portion of a vertically elongated structure whose lower portion comprises said tank.

8. The regenerator of claim 7 wherein said flue pipe includes a draft hood serially connected therein equipped with a fire arrester.

9. The regenerator of claim 8 wherein said contactor tower includes a pair of tower elements including a first tower element utilizing co-directional flow of damp gas and desiccant and a second tower element serially connected with said first tower element and utilizing reverse directional flow of damp gas and desiccant.

10. A direct fired reboiler comprising means for attachment to a desiccant regenerator system having elements designed, dimensioned, and arranged for regenerating, a liquid dessicant, said reboiler including upstanding peripheral sides, a top and bottom, a plurality of laterally spaced upstanding tubular flues disposed in said reboiler and opening upwardly and downwardly through said top and bottom, a flue plenum chamber disposed over said top into which said tubular flues open and a flue pipe opening upwardly from said plenum chamber, a combustion chamber disposed below said bottom including low pressure gas burner means therein and into which chamber the lower ends of the tubular flues open, an upper portion of said reboiler including a lateral extension, a still column supported and projecting upwardly from said lateral extension and positioned for regenerated liquid desiccant drainage from the lower end of said column into said lateral extension, said reboiler being adapted for operation with a predetermined liquid desiccant level above and below the lower and upper extremities, respectively, of said lateral extension, said reboiler including a scum baffle protected liquid desiccant outlet in an upstanding side thereof remote from said lateral extension and disposed substantially at said level and extending above and below the latter.

* * * * *